(12) United States Patent
Hartmann

(10) Patent No.: US 9,058,570 B2
(45) Date of Patent: Jun. 16, 2015

(54) DEVICE AND METHOD FOR GENERATING A TARGETED REALISTIC MOTION OF PARTICLES ALONG SHORTEST PATHS WITH RESPECT TO ARBITRARY DISTANCE WEIGHTINGS FOR SIMULATIONS OF FLOWS OF PEOPLE AND OBJECTS

(75) Inventor: Dirk Hartmann, Emmering (DE)

(73) Assignee: Siemens Aktiengesellschaft, Munich (DE)

( * ) Notice: Subject to any disclaimer, the term of this patent is extended or adjusted under 35 U.S.C. 154(b) by 546 days.

(21) Appl. No.: 13/394,252

(22) PCT Filed: Aug. 5, 2010

(86) PCT No.: PCT/EP2010/061431
§ 371 (c)(1),
(2), (4) Date: Mar. 5, 2012

(87) PCT Pub. No.: WO2011/026708
PCT Pub. Date: Mar. 10, 2011

(65) Prior Publication Data
US 2012/0166162 A1 Jun. 28, 2012

(30) Foreign Application Priority Data

Sep. 4, 2009 (DE) .......................... 10 2009 040 292
Dec. 9, 2009 (DE) .......................... 10 2009 057 583

(51) Int. Cl.
*G06F 17/00* (2006.01)
*G06Q 10/04* (2012.01)
*G06N 3/00* (2006.01)

(52) U.S. Cl.
CPC .............. *G06Q 10/047* (2013.01); *G06N 3/006* (2013.01)

(58) Field of Classification Search
None
See application file for complete search history.

(56) References Cited

U.S. PATENT DOCUMENTS 6,708,142 B1 * 3/2004 Baillot et al. ...................... 703/2
7,188,056 B2 * 3/2007 Kagarlis ............................ 703/6
(Continued)

FOREIGN PATENT DOCUMENTS

DE 102007022169 A1 11/2008
DE 102008008452 A1 8/2009

OTHER PUBLICATIONS

J. A. Sethian "A fast marching level set method for monotonically advancing fronts" pp. 1591-1595, 1996.*
(Continued)

*Primary Examiner* — Kibrom K Gebresilassie
(74) *Attorney, Agent, or Firm* — Laurence A. Greenberg; Werner H. Stemer; Ralph E. Locher

(57) ABSTRACT

A system for controlling motions of a plurality of particles in a spatial area with at least one target and at least one obstacle, has a first detection device for detecting positions of the particles at a starting time; predicting a future path search of the particles occurs by way of a computer device, wherein the region has been superimposed by a cell grid and each cell takes on various occupation and total potential states, and each cell is associated with a target potential determining how particles are attracted to a target, and is associated with an obstacle potential determining how particles are repelled by an obstacle, and wherein each particle is associated with a particle potential, wherein a total potential in a cell is made up of the values of the target potential and the obstacle potential in the cell and the particle potentials of particles in cells adjacent to the cell, and particles each change from a cell into an adjacent cell having a least total potential, and additionally, starting from a target to each cell, the target potential for each cell is calculated using a length of the shortest distance from the cell to each cell center point. A central controller controls the motions of the particles in case of forecast critical situations.

15 Claims, 7 Drawing Sheets

(56) References Cited

U.S. PATENT DOCUMENTS

| | | | |
|---|---|---|---|
| 7,447,333 B1* | 11/2008 | Masticola et al. | 382/103 |
| 7,917,343 B2* | 3/2011 | Kim et al. | 703/2 |
| 8,498,810 B2 | 7/2013 | Mayer et al. | |
| 2002/0049690 A1* | 4/2002 | Takano | 706/47 |
| 2003/0139849 A1* | 7/2003 | Kuroki et al. | 700/245 |
| 2004/0030531 A1* | 2/2004 | Miller et al. | 702/182 |
| 2004/0186745 A1* | 9/2004 | Funahashi | 705/2 |
| 2004/0249848 A1* | 12/2004 | Carlbom et al. | 707/102 |
| 2006/0056654 A1* | 3/2006 | Yoda et al. | 382/103 |
| 2008/0114564 A1* | 5/2008 | Ihara | 702/158 |
| 2008/0157984 A1* | 7/2008 | Li et al. | 340/584 |
| 2009/0078024 A1* | 3/2009 | Frith et al. | 73/28.02 |
| 2009/0306946 A1* | 12/2009 | Badler et al. | 703/2 |
| 2011/0251723 A1* | 10/2011 | Klein et al. | 700/275 |

OTHER PUBLICATIONS

A. M. Bronstein, M. M. Bronstein, R. Kimmel, "Numerical Geometry of Non-Rigid Shapes" pp. 1-346, 2008.*

A Fast marching level set method for monotonically advancing fronts pp. 1591-1595, 1996.*

Sethian J.A.: "Level Set Methods and Fast Marching Methods", second edition, Cambridge University Press (1999), Others; 1999—Abstract.

Dijkstra E. W, "A note on two problems in connection with graphs", Numerische Mathematik, 1 (1959), pp. 269-271, Others.

Helbing et al.: "Self-organaizing pedestrian movement", Environment and Planning B: Planning and Design, vol. 28, 2001, Issue 3, pp. 361-383.—ISSN 0265-8135; Others.

Burstedde et al., "Simulation of Pedestrian Dynamics Using a 2-dimensional Cellular Automation", Physica A, 295 (4), pp. 507-525 (2001); Others.

Geraerts et al.: "The Corridor Map Method: A General Framework for Real-Time High Quality Path Planning", Computer Animation and Virtual Worlds, 2007, 18, pp. 107-119, Magazine.

Barraquand et al.: "A random sampling scheme for path planning", International Journal of Robotics Research, vol. 16, No. 6, pp. 759-774, 1997; Magazine.

Gilman et al.: "Dynamic Navigation Field—a local and on-demand family of algorithms for wayfinding", Pedestrian and Evacuation Dynamics 2005 Eds. N. Waldau et al., Springer 2006; Book, pp. 1-12.

Kretz et al.: "Moore and more and symmetry", Pedestrian and Evacuation Dynamics 2005, Eds. N. Waldau et al., Springer 2006; Book, pp. 1-12.

Kretz et al.: "F.A.S.T. Floor field- and Agent-based Simulation Tool" arXiv.org arXiv:physics/060909, pp. 1-11.

Kinkeldey, C,: "Fußgängersimulation auf der Basis zellulärer Automaten", Studienarbeit Universität Hannover, 2003.; Others;—English abstract.

Treuille et al: "Continuum crowds", ACM SIGGRAPH Papers, SIGGRAPH 2006, Association for Computing Machinery USA, pp. 1160-1168.

Kimmel et al: "Optimal algorithm for shape from shading and path planning", Journal of Mathematical Imaging and Vision, Kluwer Academic Publishers, NL, May 1, 2001, pp. 237-244; Magazine.

* cited by examiner

FIG. 1
PRIOR ART
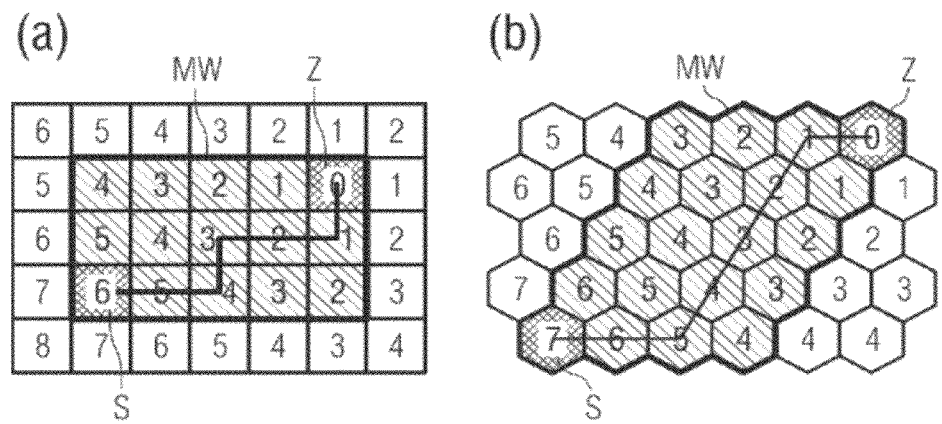
FIG. 2A
FIG. 2B
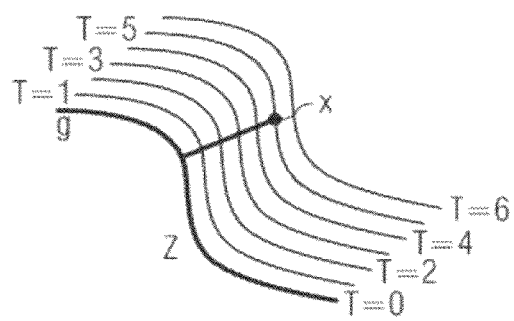
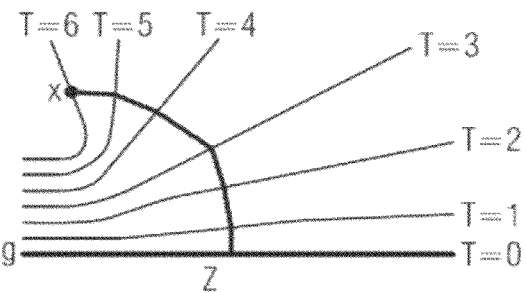

(a)

(b)

(c)

DEVICE AND METHOD FOR GENERATING A TARGETED REALISTIC MOTION OF PARTICLES ALONG SHORTEST PATHS WITH RESPECT TO ARBITRARY DISTANCE WEIGHTINGS FOR SIMULATIONS OF FLOWS OF PEOPLE AND OBJECTS

CROSS-REFERENCE TO RELATED APPLICATION

This application is a §371 of copending international application PCT/EP2010/061431, filed Aug. 5, 2010; the application also claims the priority, under §119, of German patent applications DE 10 2009 040 292.6, filed Sep. 4, 2009, and DE 10 2009 057 583.9, filed Dec. 9, 2009; the prior applications are incorporated by reference in their entirety.

BACKGROUND OF THE INVENTION

Field of the Invention

The present invention relates to a system and a method for controlling motions of a multiplicity of particles in a spatial region comprising at least one target and at least one obstacle.

Mass-typical phenomena occur at any place where people gather en-masse. Some of these phenomena may be life-threatening, for example if panic breaks out at a mass event. Further phenomena require suitable steering measures so as to control events effectively.

Devices for reproducing flows of people imitate the behavior of a large number of people at different mass events, for example during the Oktoberfest beer festival, in particular for statistical purposes and so as to improve safety at the location. One objective for example is the identification of critical masses with the aid of the simulation, that is to say the identification of risks caused by concentrations of people and critical flows of people as well as a prediction regarding the temporal progression thereof so as to be able to introduce suitable measures.

A device for simulating a flow of people calculates the next position of a person, in terms of time and space, on the basis of mathematical methods and thus on the basis of set provisions which are intended to mimic the human behavior pattern. Different models from the field of micro- and macro-modeling are used, more specifically methods based on partial differential equations through to methods based on cellular automata.

According to the prior art, these approaches are already provided to simulate flows of people in particular. However, these conventional approaches do have shortcomings, which limit an accurate reproduction of mass phenomena and thus the usability of simulation results.

A frequently selected approach for simulating flows of people is that of methods based on cellular state automata [1]. A region, for example a street of houses, is superimposed by a cell grid. Hexagonal grids are selected for example. Square or triangular cells are just as common. Each cell may take on different states, for example filled with an obstacle, or occupied by a person, or empty. Such states are updated over the course of time by rule sets or automata. Cells may also contain targets which people aspire to reach. Cells may also contain sources from where people originate. The following sub-models and their interaction form the basic ideas of this automaton:

a target model determines how objects/people move towards a target.

a model of object or person motion determines how objects/people behave towards one another.

an obstacle model defines how objects, people and obstacles move.

The value of an approach which mimics mechanisms known from the physics of electronics is now proven. This is implemented by potential fields in the mathematical formulation.

Targets attract objects or people, just like a positive charge attracts electrons. The strength of the potential field is determined in the prior art as a function of the Euclidean distance between the person or object and the target. For this approach, an unobstructed view is necessary, so that people do not get caught on obstacles. Alternatively, a flooding method is thus used in the prior art, in which the number of cells to be covered is counted around obstacles starting from the target to the person. The potential is determined as a function of the number of cells between the target and the person.

Objects or people repel one another, just like electrons repel each other. The strength of the potential field is conventionally determined as a function of the Euclidean distance between the people or objects.

Obstacles repel objects or people, just like a negative charge repels electrons. The strength of the potential field is conventionally determined as a function of the Euclidean distance between the person or object and the obstacle.

A key problem when modeling flows of objects and people is the path search to the target. If an unobstructed view to the target is possible, the finding of the target is trivial. Objects and people move directly towards the target, possibly with small deviations. However, if an impenetrable obstacle is located between the people and the target, it is not easy to determine the direction of travel. For example, in the case of a U-shaped obstacle, open towards the people, in front of the target, the strategy to move directly towards the target would result in people becoming trapped in the obstacle.

Complex methods for path searching are necessary in all forms of methods for simulating flows of objects and people in which there are obstacles. These methods are intended to provide a path to the target and also at the same time to consider realistic human behavior. Realistic human behavior includes, inter alia, the selection of the shortest paths and an avoidance of certain areas. For example, roads are avoided and, where necessary, are crossed merely in an almost perpendicular direction.

The device proposed in this instance enables such a realistic path search. Many problems of conventional methods, which in many cases demonstrate unrealistic behavior of the flows of people and objects, are avoided. In particular, the proposed device makes it possible to implement a certain intelligence of the particles, which are considered for example to represent pedestrians. It is thus possible to form an aversion to a specific territory, for example the avoidance of roads or dense crowds. Such territories are basically only entered if they cannot be avoided, for example if a target is on another side of the road. The path over this territory is kept as short as possible. For example, this is shown in FIG. 7a. Such a realistic behavior is significant in particular if the open spaces to be considered are large and the expected density of people is low. For example, this concerns an optimization of the design of shopping centers or the consideration of complex spaces, partly covered by buildings.

A much more realistic approach compared to conventional devices is provided. Conventional devices and methods sometimes demonstrate very unrealistic behavior of people and objects. The device proposed in this instance leads to a significant increase in validity with use of simulations of flows of objects and people, with only a minimally increased computational effort.

Numerous methods for the target finding of flows of people can be found in the literature. These can be divided into two approaches: graph-based path searches and path searches on the basis of potentials or metrics.

Graph-based path searching solves the problem of view obstruction by introducing orientation points. At least one orientation point, which can be controlled, is to be visible from each place in the simulation area. If at least one orientation point is to be visible from each place in the simulation area, this means that a direct connection of two orientation points is not disturbed by an obstacle. Upon reaching the orientation point, a further orientation point will, at the latest, be visible and may serve as the next orientation point. The exact point when a change in orientation point should take place is an open problem. However, the results of corresponding simulations of flows of objects and people depend significantly and critically on this decision. All orientation points together, including the actual target, form a graph so that the search for a path is reduced to the problem of finding a path in a graph. The main drawback of this method is the fixation on individual structures, the orientation points and edges, which in many cases leads to an unrealistic behavior of the people and objects. The introduction of an intelligent path selection on the basis of preferred territories is thus only possible to a very limited extent.

A second alternative is path searching on the basis of potentials or metrics. This path searching method, which above all is used in cellular automata, involves the fixation on individual structures. Starting from the target, a value is assigned to each point in the space. The values increase with distance from the target. This spatial assignment or function is referred to as a potential or metric. If all other effects in simulations of flows of objects and people, such as behavior towards one another and behavior when negotiating obstacles or random effects are disregarded when establishing the motion method, the motion method is reduced to a movement towards the minimum of the potential thus determined. The potential values of the selected path increase with time until the person has finally reached the potential minimum, since all other typical behaviors implemented in current simulators of flows of objects and people, such as repulsion of other people and of obstacles, can also be modeled by means of potential, and path searching on the basis of the potential minimum can also be retained with consideration of other effects.

Generally, as is the case for example with an unobstructed view, a corresponding potential function can only be provided with difficulty as an analytical function, that is to say a function which can be provided explicitly. In the case of an unobstructed view, the Euclidean distance for example is a suitable potential function. In the case of a blocked view, the potential function has to be calculated in the simulation itself, which necessitates a discretization for potential calculation, even with a continuous and thus grid-independent approach. In all conventional simulators of flows of objects and people, in order to calculate the target potential, the minimum number of moves required to the target along the discretization directions is taken as a basis for potential, or a version scaled with a constant parameter. The potentials are calculated using "Dijkstra's algorithm". When using a rectangular grid this approach corresponds substantially to the "1-metric" or "Manhattan metric". This is shown in FIG. 1.

On the one hand, Dijkstra's approach is not fixed to individual predefined structures, but on the other hand the approach provides an unrealistically large number of possibilities of motion. This is shown in FIG. 1. This leads to an unclear and unrealistic behavior of the flows of object and people, as shown in FIG. 6a. This even leads in some cases to the freezing of the people in the simulations. It is necessary to correct the potential approach. If the view to the target is unobstructed, such a correction is quite simple. However, if an obstacle has to be navigated, there is no possibility for correction in current simulators. The next cell is selected randomly or heuristically from the cells with the lowest potential. Furthermore, the selected paths are generally longer than the shortest direct path owing to the discrete number of directions. Similarly with regard to motion speed, a correction with the objective of more realistic walking times for given distances is necessary.

A reliable and, at the same time, simple method for realistic path searching in simulations of flows of objects and people is thus lacking.

BRIEF SUMMARY OF THE INVENTION

The object of the present invention is to control motions of a multiplicity of particles, in particular people, in a spatial region comprising at least one target and at least one obstacle. A device or system for modeling particle flows is to realistically reproduce a path search to the target, wherein in particular an obstacle is formed between the particles and the target. A path to the target is to be provided and a realistic particle is to be considered, for example a selection of the shortest path or a preference for or avoidance of specific areas, in particular in the case of large open spaces to be considered and low expected particle densities. The validity of simulations of flows of people is to be significantly increased and a computational effort is to be increased merely to a minimal extent.

The object is achieved by a device and a system according to the main claim and by a method according to the co-ordinated claim.

According to a first aspect, a system for controlling motions of a plurality of particles in a spatial region comprising at least one target and at least one obstacle is provided. The system is characterized by detecting positions of the particles by means of a first detection device at a starting time;

predicting a future path search of the particles by means of a computer device, wherein the region has been superimposed by a cell grid and each cell takes on various occupation and total potential states, and each cell is assigned a target potential determining how particles are attracted to a target, and an obstacle potential is assigned determining how particles are repelled by an obstacle, and wherein each particle is assigned a particle potential, wherein a total potential in a cell is made up of the values of the target potential and the obstacle potential in the cell and the particle potentials of particles in cells adjacent to the cell, and particles each change from a cell into an adjacent cell having a least total potential, and additionally, starting from a target to each cell, the target potential for each cell has been calculated using a length of a shortest distance from the target to a respective cell centre point;

controlling the motions of the particles in case of forecast critical situations by means of a central controller.

In this case particles are people in particular. The computer device may be a simulation device, which uses particles which in particular consist of a metal. Such particles may be considered in the simulation device to be representative of people. People with vehicles or animals are also included as particles by the present invention.

For example, a detection device is a sensor, in particular a camera or a noise detector.

A starting time is any desired moment in time at which a spatial arrangement of the particles is determined.

Critical situations are all situations which make it necessary to control particle motions. For example, such situations may be a pulling in of a train, an overshoot of a particle density over a defined value, or a possible outbreak of panic.

The path search may be calculated both by spatially continuous or grid-free approaches and by discrete or grid-based approaches, for example as is the case with cellular state automata. The path search is thus compatible with all conventional modeling approaches. In particular, no modification is required in terms of other interactions, such as particle repulsion. Conventional modeling in current flows of objects and particles sometimes require merely minor modifications.

Compared to Dijkstra's algorithm, which is used conventionally, the computer device or simulation device requires merely a slightly greater computational effort, but at the same time exhibits a significantly more realistic behavior of the particle flows or flows of people and objects. According to Dijkstra's algorithm, a complexity N, wherein N is the number of discretization points or cells, is to be expected. According to the device according to the invention, a complexity lies at N LOG (N).

Starting from the target, in each point or discretization point, for example the cell centre point of the cellular state automaton, the potential with the shortest distance of the point to the target, that is to say the length of the shortest path, is initialized.

Each particle (or person or object) locally determines the direction of the shortest path to the target with the aid of an approximation of the gradient of the potential, that is to say the direction of the greatest change in the potential. Each person moves in the direction of the shortest path in the case of a deterministic motion and with a disregard of all further effects.

As has already been mentioned above, the present invention is furthermore based on the idea of establishing the direction of the shortest path by calculating the gradients of the previously determined potential, more specifically, the greatest change. The direction of the shortest path can thus be determined in each cell. Even in the case of view-obstructing obstacles, the information of the direct and shortest path to the target is thus provided.

The simulation device according to the invention can thus generally also be implemented without the above-described corrections with regard to motion directions and speeds. If merely the type of calculation of target potential is exchanged in the conventional simulators of flows of objects and people, much better motion patterns are thus produced compared to use of the conventional Dijkstra's algorithm. For example, much fewer bottlenecks occur at corners of obstacles. At the same time, only a minimal modification of the simulators provided is necessary. Generally, merely the function for potential calculation has to be replaced.

In accordance with the present device, the actual direction of travel is determined by means of approximated gradients or directions of the strongest potential change, wherein any approximations are possible, for example methods of higher order.

Furthermore, a realistic calibration of essential parameters, in particular in cellular approaches, is possible by the approach according to the invention with realistic motion patterns. This is a key point for commercial applications.

Furthermore, the simulation device allows a better observance of guidelines for simulators of flows of people thanks to the graphic, more realistic modeling.

According to a second aspect, a method for controlling motions of a multiplicity of particles in a spatial region comprising at least one target and at least one obstacle is provided. The method is characterized by the following steps:

detecting positions of the particles at a starting time;

predicting a future path search of the particles, wherein the region has been superimposed by a cell grid and each cell takes on various occupation and total potential states, and each cell is assigned a target potential determining how particles are attracted to a target, and an obstacle potential is assigned determining how particles are repelled by an obstacle, and wherein each particle is assigned a particle potential, wherein a total potential in a cell is made up of the values of the target potential and the obstacle potential in the cell and the particle potentials of particles in cells adjacent to the cell, and particles each change from a cell into an adjacent cell having a least total potential, and additionally, starting from a target to each cell, the target potential for each cell has been calculated using a length of a shortest distance from the target to a respective cell centre point;

controlling the motions of the particles in case of forecast critical situations.

Further advantageous embodiments are claimed in conjunction with the dependent claims.

According to an advantageous embodiment, the target potential can be calculated by means of the computer device by forming the target as a curve g of any shape and considering a propagation of a wave front starting from the target, wherein a propagation speed F (x, y) is selected at right angles to the wave front, and by assigning a future time T (x, y) of the wave front for each point (x, y) in the space, wherein the future time T (x, y) is the target potential.

Initialization or Calculation of the Potential.

The aim is to initialize each cell of the device/of a cellular state automaton with the shortest distance from its cell centre point (x, y) to the target, that is to say the length of the shortest path. If the target consists merely of a cell of the cellular state automaton, the possibly weighted distance to the cell centre point of the target is used as a basis. If the target consists of a plurality of cells, the distance to the polygon provided by the centre point of the outer cells of a target is considered for example. In the most general case however, the target may also be considered as a curve g of any shape, the distance to which is to be calculated.

A fundamental idea of the approach presented here is, instead of calculating the shortest distances, to alternatively consider the propagation of a wave front starting from the target. At the moment in time t=0, the wave front is located on the outer edge of the target, that is to say the curve g. The wave front propagates at a predefined speed F (x, y) at right angles to the front, that is to say in a normal direction. In the case of obstacles, F(x, y)=0 is true for the propagation speed since these obstacles cannot be penetrated by the wave. The future time T(x, y) of the wave is now assigned to each point (x, y) in the space. T(x, y)=0 applies for points within the target, and T(x, y)=∞ applies for points which cannot be reached, for example points in obstacles.

If F(x, y)=1 applies for all points (x, y) which do not lie in an obstacle, the future time thus corresponds precisely to the Euclidean length of the shortest path. The future times thus correspond to the sought potential, and the potential thus calculated, which corresponds to the actual distances, that is to say the Euclidean distances, will be referred to hereinafter as the Euclidean potential, in contrast to the "Manhattan potentials", which are based on a 1-metric/Manhattan metric, that is to say a calculation of distance along the axes of symmetry of the cellular automata. This corresponds to a Manhattan metric or 1-metric.

An essential feature of a device according to the invention is the calculation of potential for target determination by means of future times of wave fronts starting from the target. A known fast-marching method is used in simulations of flows of objects and people to effectively determine the development of the wave fronts and to thus calculate the potentials which are used for path searching.

According to a further advantageous embodiment, the propagation of the wave front can be described mathematically by an eikonal equation:

$$F(x,y)^2 \cdot [(\delta_x T(x,y))^2 + (\delta_y T(x,y))^2] = 1 \qquad \text{Equation 1}$$

The propagation of the wave can be described mathematically by the eikonal equation:

$$F(x,y)^2 \cdot [(\delta_x T(x,y))^2 + (\delta_y T(x,y))^2] = 1$$

where $T(x, y)=0$ for $(x, y)$ over g, wherein $\partial_{x,y}$ are the partial derivatives with respect to the location. In the proposed approach, the shortest distances and future times are thus determined based on the solution of a partial differential equation: the eikonal equation.

Similarly to the potentials, a more explicit expression for the future time $T(x, y)$, that is to say an explicit solution of the eikonal equation, cannot generally be provided. A numerical solution of the eikonal equation is necessary. An effective option is provided by the known fast-marching method. Based on the grid provided by the centre points of the hexagonal cells of the state automata, the solution of the eikonal equation, that is to say the future times, is approximated. The Euclidean or closest described weighted distances are thus also approximated. The distances thus obtained form the target potential, which is used for target finding.

According to a further advantageous embodiment, a distance weighting, which is location-dependent, can be performed by selecting the propagation speed $F(x, y)$, wherein the propagation speed $F(x, y)$ is inversely proportional to the distance weighting.

The target finding developed in accordance with the invention allows a path search by means of a potential approach with consideration of arbitrary metrics, that is to say with arbitrary distance weightings, for example depending on the territory. In particular, a path search based on actual distances, that is to say the Euclidean metric, is possible. With use of the developed device, the flows of objects and people or particles demonstrate realistic motion behavior. If all other influences are ignored, for example random events and avoidance of other repulsions of people by obstacles, the shortest path to the target is selected with regard to the underlying metric. The people follow the geodetic lines. With use of the actual distance weighting of the Euclidean metric, these are the straight lines if the view to the target is unobstructed. However, the approach developed in accordance with this invention also allows the implementation of artificial intelligence by means of different weighting of distances by means of use of arbitrary metrics. For example, it is thus possible to avoid specific territories.

An arbitrary distance weighting (metric) can be used as a basis, that is to say paths over a specific territory or paths through groups of people are provided with a greater distance than the Euclidean distance. This makes it possible to represent the avoidance of specific territories.

If an alternative $F(x, y)>0$ is selected, the specific future times and therefore the distances, wherein future times always correspond to distances in the approach according to the invention, thus correspond to another weighting of the distances, that is to say any metric other than the natural weighting, that is to say the Euclidean metric.

Weighting of the Distances; Selection of the Metric.

A location-dependent weighting of distances is possible by a corresponding selection of the propagation speed $F(x, y)$. If a smaller propagation speed is selected in specific areas, the wave thus propagates there more slowly. Points in the corresponding areas are reached later, since the wave covers shorter distances in the same period of time. Distances in these regions are thus weighted more heavily. The shortest paths generally try to avoid these areas and therefore the people and objects also avoid these areas since they move in the direction of the shortest path and thus follow this path. The direction of the shortest path in each point can be determined in each case by determining the gradient, that is to say the direction of the greatest change in potential (see section below for determining the direction of the shortest path or the section on motion methods).

If a person were to move in the direction of the greatest change in potential at a locally different speed $F(x, y)$, that is to say at precisely the wave propagation speed, he would reach the target more quickly than on all other paths. Generally however, the speed of the person does not correspond to the propagation speed of the wave $F(x, y)$, even though both can vary locally at the same time. The propagation speed of the wave $F(x, y)$ is merely an auxiliary quantity in this context and is inversely proportional to the weighting of the distances, that is to say the metrics. It does not coincide with the actual speed of particles (objects or people). For example, a person thus moves approximately just as fast over grass and paved surfaces. Generally however, the person would try to avoid the grass, and therefore distances over this would be weighted more heavily. This would imply a slower propagation speed $F(x, y)$ of the wave propagation in order to determine the wave future time or the potential $T(x, y)$. The actual speeds of the person would not be variable however, and would be constant in all areas. $F(x, y)$ thus does not coincide with the speed of the person, but merely with the preference for specific territories or other conditions.

Owing to the selection of a corresponding propagation speed $F(x, y)$, it is possible to implement a partly artificial intelligence of the objects and people. Specific territories or specific regions are avoided by the people and objects.

Potentials for determining the target are calculated by means of future times of wave fronts starting from the target by solving the eikonal equation. Distances can be attributed to future times, which makes it possible to implement arbitrary distance weightings (metrics), in particular the Euclidean metric, that is to say the actual metric.

Different assessment of preferred or unpreferred territories by different weighting of the distances or different metrics allows a partly artificial intelligence of the people and objects, since these move along the geodetic lines, that is to say the shortest paths with arbitrary spatially variable distance weighting.

The device makes it possible to advantageously effectively implement shortest paths with respect to arbitrary metrics or arbitrary weightings of the distances in the simulations of flows of objects and people. In particular in the case of potential-based cellular state automata, the computational effort is merely minimally greater, more specifically N LOG(N) instead of N, where N is the number of discretization points, for example the number of cells, without additional storage requirement. The paths are thus reproduced much more realistically, since a certain intelligence of the pedestrians is enabled by a different weighting of the distances. It is thus possible to implement preferences for specific territories, for example the avoidance of roads, via the distance weighting. Such territories are then basically only entered if this cannot be avoided, for example if a target is on the other side of the road, and the path over this territory is kept as short as possible.

Furthermore, the device according to the invention advantageously allows actual travel times of people to be approximated as accurately as possible. Merely the discretization accuracies of the fast-marching method are restrictive. This correction is detached from potential. For example, it may also be applied with a direct view, since the Euclidean distances can be determined directly in this instance.

According to a further advantageous embodiment, the computer device can locally calculate the direction of the maximum change in magnitude of the target potential as the direction of the shortest path to the target, and based on this information can approximate a realistic motion along the shortest path over the cell grid by means of a direction correction.

Motion Methods.

When using simulators of objects and people which are based on discrete spatial structures, for example in the case of cellular automata, the direction of motion cannot be selected arbitrarily. The motion along the direction of motion predefined by the discretization may lead to unrealistic motion patterns and also to unrealistic motion times or average speeds. The path along the predefined direction is longer than the direct shortest path. Even when using potentials building on the devices presented in this invention, corrections are necessary.

In conventional potential-based motion methods, in each step the respective adjacent cell with the smallest potential starting from the current position is selected (method of zero order), and with random path searches the adjacent cell is allocated a greater probability. Even when using these conventional motion methods in combination with the methods implemented in this invention for calculating the underlying potentials for the purpose of target finding, much better results are obtained than with use of the Manhattan potentials used in current simulators of flows of people and objects, which are based on an unrealistic metric. The latter lead primarily to a multiplicity of possible paths. However, if merely the local potential minimums are considered, deviations from an ideal path are sometimes just as large with use of the methods developed here for calculating potentials.

According to a further advantageous embodiment, starting from the target potentials of three cell centre points, the direction of the change in magnitude of the target potential can be determined locally by means of the computer device by means of interpolation for each point of a triangle formed by the three cell centre points.

However, according to the numerical solution of the eikonal equation, the values for the future times or the potential are provided merely in the grid points of the underlying grid. That is to say in the cell centre points in accordance with the present device. By means of interpolation however, the gradient can also be obtained using the device presented here. An area is spanned locally by linear interpolation of points of a triangle P0, P1 and P2, which area passes through the three points. With the aid of this area, the gradient or direction of the strongest change can be determined locally in each point of the triangle formed by P0, P1 and P2. The solution proposed by way of example in this instance corresponds to an interpolation of first order, that is to say the potential for determining the gradient. Any other approaches for the approximate determination of the gradient are possible however. In principle, any number of values and grid points can be consulted in the approach developed in this instance in order to determine the local direction of the strongest change by means of interpolation.

In the approach for path searching proposed in accordance with the device according to the invention however, the direction of the shortest path to the target can be determined in each cell, as illustrated previously. This corresponds to a method of first or higher order. The information regarding the direction of the shortest path can be used to correct the conventional approach. A better approximation of the shortest path or a motion along said path is thus enabled. This corresponds to a method of higher order. In the corrections newly developed in this instance, the path of the individual people can be selected in such a way that there is hardly any deviation from the optimal path in spite of the restriction of the directions of motion by the discrete structure of the cellular state automata. Deviations are generally unavoidable owing to the possibilities for motion limited by the grid.

Motion Methods; Direction Correction

In the case of a grid-based device, for example with cellular automata, a free movement to the ideal position in the direction of the target is not generally possible. A realistic movement along the shortest path over the grid is approximated with the aid of correction mechanisms on the basis of the information of the direction of the shortest path.

A path search is carried out with use of the local direction of the shortest path or the direction of the greatest change in potential. This means that the conventional motion method is corrected based on the direction information, even if the view of the target is obstructed.

According to a further advantageous embodiment, a consideration of an adjacent cell with a smallest target potential value and additionally two adjacent cells to the left and right of the adjacent cell with the smallest target potential value may take place for direction correction starting from a current cell. Starting from the local direction of the shortest path of a cell centre point of the current cell, a normal deviation $n\Delta$ can be established for these three adjacent cells at right angles to the direction of the shortest path, wherein a normal deviation $n\Delta$ comprises a direction-dependent sign in each case. In addition, the sum $N\Delta$ of all normal deviations $n\Delta$ may be established from the previous steps of an actual particle. The adjacent cells acting as the next cell for the particle can be selected in such a way that the absolute value of the sum $N\Delta$ of all previous steps of the particle, including the normal deviation $n\Delta$, is minimal, wherein the direction correction may occur as a result of the selection.

According to a further advantageous embodiment, if the selected adjacent cell is not the adjacent cell with the smallest target potential value, the target potential of the selected adjacent cell is decreased by means of the control device until it is less than the smallest target potential value.

Motion Methods; Speed Correction

According to a further advantageous embodiment, a speed correction for a momentary particle speed may take place by means of the known previous deviation from a shortest path.

Furthermore, correction factors for the momentary speed are determined by means of the known previous deviations from an ideal path so as to thus ensure predefined average speeds of the simulated person for any paths, even in the case of grid-based methods.

According to a further advantageous embodiment, a direction of a change in magnitude of the target potential may locally determine the direction of the shortest path to the target, wherein, for speed correction starting from the local direction of the shortest path of a cell centre point of a current cell, a tangential deviation tΔ in the direction of the shortest path can be established for any step for each cell which is entered next from the current cell. Furthermore, the sum TΔ of all tangential deviations tΔ of all previous steps of a current particle can be established. An additional step for the particle can be granted by means of the control device if the sum TΔ of all tangential deviations tΔ of all previous steps for the particle is greater than an integral multiple of a cell centre point distance, wherein an effective speed of the particle is thus increased locally in terms of time and is therefore corrected.

The tangential deviations tΔ calculated in each step can be used to correct speed. If the sum of all deviations tΔ of all previous steps of this person exceeds an integral multiple of the grid distance, the person will thus be granted an additional step. The effective speed of the person is increased locally in terms of time. This corrections allows effective speeds, which approximate the expected journey times for a given path much better than without correction or with use of known corrections.

In the advantageous memory-saving implementation of the device according to the invention, merely the sum of all deviations nΔ as well as the sum of all deviations tΔ have to be stored. In each time step, the corresponding current deviations nΔ and tΔ are added together after selection of the move. Owing to the minimal number of variables to be calculated, the device according to the invention is also advantageous in terms of computational intensity.

According to a further advantageous embodiment, the sum NΔ of the normal deviations or the sum TΔ of the tangential deviation may be set to 0 by means of the computer device if the particle is pushed too far from its original path or if the particle cannot freely select its path.

The correction method considered by way of example takes into account the sums of all deviations NΔ and tΔ in the past of each person or each particle. Alternative approaches are also possible. If the person or particle is pushed too far from their original path, for example by interaction with other particles or if the particle finds itself in a situation in which the path cannot actually be freely selected, for example in the case of a dense crowd of particles, it is appropriate to reinitialize the sums of all deviations, that is to say to set to 0.
Enhancements With regard to the above-presented corrections of the conventional motion method of an advantageous implementation for simulations of flows of objects and people, there was a restriction to the current direction of the shortest path to the target. Information regarding the greatest change in the potential however, that is to say the direction of the shortest path, offers a large number of alternative correction options compared to the above-presented implementations. For example, a current shortest path can be determined by a weighted averaging of the optimal paths or shortest paths in the past, that is to say the gradients in the previous counts. In this regard, the deviations nΔ and $t_A$ would then be selected. A summation of the previous deviations $n_A$ would not be necessary; it would be suffice to take into account the current deviation $n_A$ when considering a potential correction.

According to a further advantageous embodiment, a direction of a change in magnitude of the target potential, that is to say the direction of the shortest path to the target, can be determined locally by means of the computer device and a current shortest path for the particle can be determined by means of a weighted averaging of a change in the magnitude of the target potential of the shortest path of a particle in previous cells.

According to a further advantageous embodiment, a path selection of the particles may be random-based and the computer device may calculate probabilities of individual cells on the basis of the total potential and the information regarding the direction of the shortest path. In other words, the above device is not limited to a deterministic path search. An extension to random-based path selection is also possible. In the latter case, the corresponding probabilities of the individual cells would not only be calculated on the basis of the potential, but also based on the information provided regarding the direction of the shortest path. A correction of the above-presented correction based on deviations from the optimal direction is also possible.

According to a further advantageous embodiment, the central controller can control building elements.

According to a further advantageous embodiment, building elements may be doors, windows, signs, loudspeakers, lifts, escalators and/or lights.

The present invention will be described in greater detail on the basis of exemplary embodiments in conjunction with the drawings, in which:

BRIEF DESCRIPTION OF THE SEVERAL VIEWS OF THE DRAWING

FIG. 1 shows two exemplary embodiments of conventional cell grids of a device according to the invention;

FIG. 2 shows two exemplary embodiments of a propagation of a wave front starting from a target;

DESCRIPTION OF THE INVENTION

Figure 3:
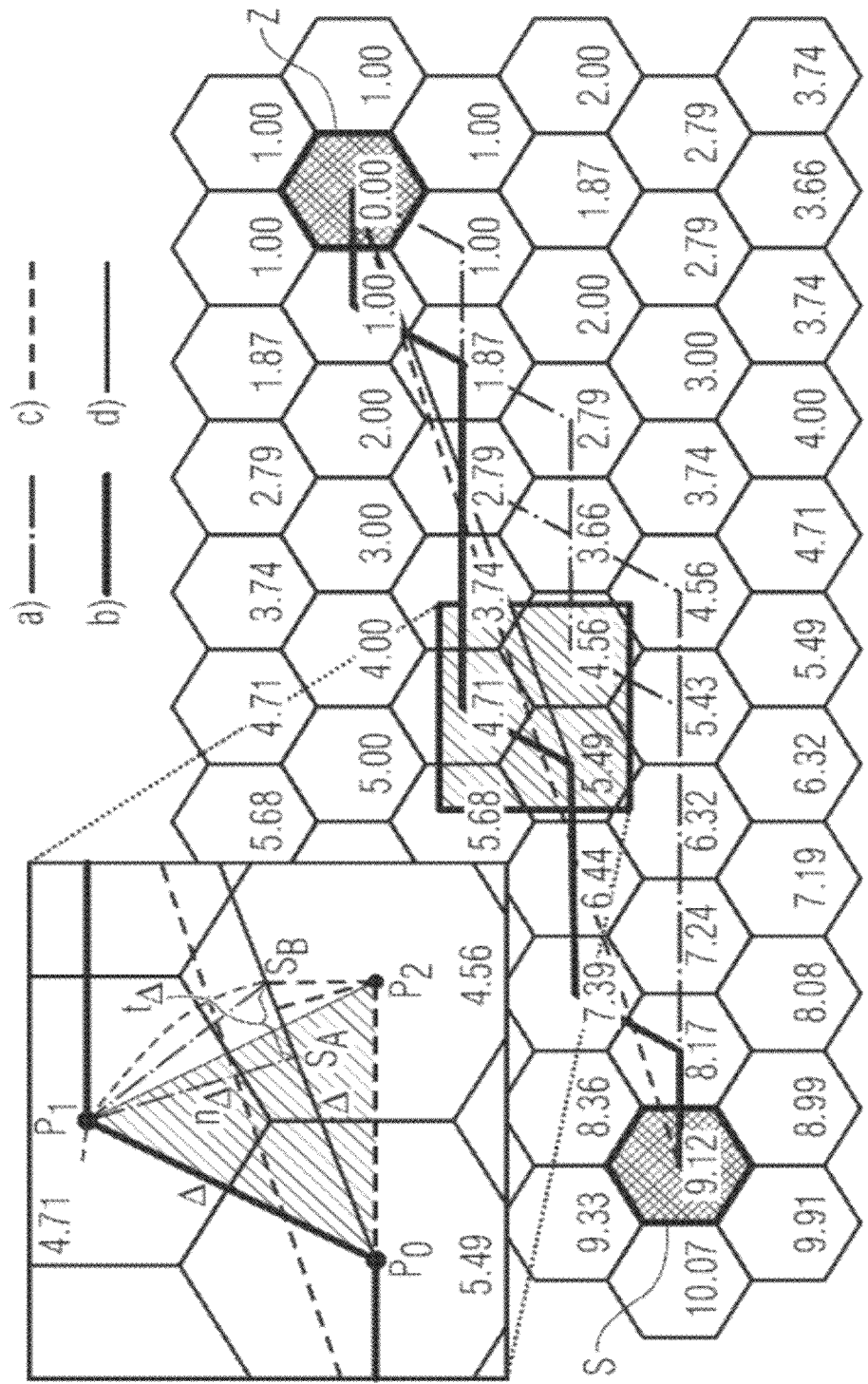
FIG. 3 shows a hexagonal cell grid with an approximated Euclidean potential.

FIG. 1 shows two exemplary embodiments of conventional cell grids for a device according to the invention. FIG. 1a shows a cell grid with square cells. FIG. 1b shows a cell grid with hexagonal cells. In all conventional simulators of flows of objects and people, to calculate the target potential the minimum number of moves required to the target along the discretization directions is used as a basis for potential, or a version scaled with a constant parameter. The potentials are calculated using "Dijkstra's algorithm". When using a square grid, this approach basically corresponds to the "1-metric" or "Manhattan metric". Possible paths MW are simply hatched. These possible paths MW are produced with use of a potential-based path search based on Dijkstra's algorithm or the Manhattan metric. Without specific potential correction or path selection mechanisms, a multiplicity of possible paths of equal length is provided both for square and hexagonal grids. S denotes a starting cell. Z denotes a target cell. The Dijkstra approach is not limited to individual predefined structures, but the approach provides an unrealistically high number of possibilities of motion. This leads to an unclear and unrealistic behavior of the flows or objects and people.

An advantageous implementation of a device according to the invention as a cellular state automaton with an underlying hexagonal grid will be elaborated hereinafter by way of explanation. For improved understanding, a purely deterministic path search will be assumed. Furthermore, only an individual person will be considered, whose path is determined deterministically merely by the target potential. Interactions with other people or particles will not be considered. A corresponding extension to this, as is to be found in most conventional simulations of flows of objects and people, is uncomplicated and easily possible. Interactions with other particles and obstacle objects can be implemented in all simulations of flows of objects and people by additional potentials which are added to the target potentials.

The considered cellular state automaton consists of a regular grid with hexagonal cells (shown in FIG. 1b), over which the considered objects or particles move in discrete time steps. As described before, a potential is assigned to each cell. In FIG. 1 there is a "Manhattan potential". A cell may or may not be occupied either by a person or particle. The particles each move in discrete time steps to the next cell, wherein the direction of motion is determined by the potential of the adjacent cells, as will be explained hereinafter. If more than one particle or person is considered, the path determination also depends on those particles or people located in the adjacent cell, but this will be disregarded in the following consideration. As mentioned previously, an extension of the proposed device is possible without difficulty.

The device according to the invention for path determination carries out four main sub-steps: the initialization or calculation of the potential, the weighting of the distances and selection of the metric, the determination of the direction of the shortest path, and the actual motion with which a direction correction and/or speed correction is undertaken.

The device has been illustrated by way of example for a cellular state automaton with a regular hexagonal grid. In this case, the discretization of the cellular state automaton and the discretization used for numerical solution of an eikonal equation coincide with one another. However, a concordance of the grid is not necessary. A generalization of the method for any, in particular irregular grid is possible, since effective methods for solving an eikonal equation are known in the literature. In particular, it is even expedient to solve the eikonal equation on a much more approximate grid so as to keep the computational effort for initializing the potential as low as possible. Local gradients for determining direction are also provided in this case. The described method can thus be used for all known cellular state automata as well as continuous simulations of objects and people. In the latter case however, the correction step is superfluous since particles and people can move freely.

FIG. 2 shows two embodiments of a propagation of a wave front starting from a target. FIG. 2a shows a propagation of a wave front with speed $F(x, y)=1$. FIG. 2b shows the propagation of a wave front with a speed $F(x, y)>0$ which is not constant over space. The device according to the invention carries out the following steps: starting from the target, in each point or discretization point, which for example are the cell centre point of the cellular state automata, the potential with the shortest distance to the target, that is to say the length of the shortest path, is initialized. An arbitrary distance weighting (metric) can be used as a basis, that is to say paths over specific territories or paths through groups of people are allocated a greater distance than the Euclidean distance. This makes it possible to avoid certain territories.

FIG. 2 is a schematic view of the propagation of a wave front a) with constant propagation speed $F(x, y)$ at right angles to the front, and b) with variable propagation speed $F(x, y)$ at right angles to the front. In b) the propagation speed is much lower in the left lower corner than in the rest of the space. The fronts of the wave at specific times are shown in each case, more specifically as thin lines, and the path with the shortest distance, which is illustrated as a dark line, from $x=(x, y)$ to the target is shown, given by the curve g.

A fundamental idea of the present invention is, instead of calculating the shortest distances, to alternatively consider the propagation of a wave front starting from the target. At the moment in time $t=0$, that is to say the start of the method, the wave front is located on the outer edge of the target, that is to say of the curve g. The wave front propagates at a predefined speed $F(x, y)$ at right angles to the front, that is to say in normal direction. In the case of obstacles, $F(x, y)=0$ is true for the propagation speed since these obstacles cannot be penetrated by the wave. The future time $T(x, y)$ of the wave is now assigned to each point $(x, y)$ in the space. $T(x, y)=0$ applies for points within the target, and $T(x, y)=\infty$ applies for points which cannot be reached, for example points in obstacles.

If $F(x, y)=1$ is selected for all points $(x, y)$ which do not lie in an obstacle, the future time thus corresponds precisely to the Euclidean length of the shortest path, that is to say the actual distance or Euclidean distance as shown in FIG. 2a. The future times thus correspond to the sought potential. The potential thus calculated, which corresponds to the actual distances, that is to say the Euclidean distances, will be referred to hereinafter as the Euclidean potential, in contrast to the Manhattan potential, which is based on a 1-metric, that is to say a calculation of distance along the axes of symmetry of the cellular automata, in other words a Manhattan metric or 1-metric.

If, as illustrated in FIG. 2b, an alternative $F(x, y)>0$ is selected, the specific future times and therefore distances thus correspond to another weighting of the distances, that is to say any metric other than the natural weighting, that is to say the Euclidean metric. According to the present approach, future times always correspond to distances, see also the section on weighting of distances and selection of the metric.

A location-dependent weighting of distances is possible by selection of the propagation speed $F(x, y)$, as illustrated in FIG. 2b. If a smaller propagation speed is selected in a specific area, the wave thus propagates there more slowly. Points in the corresponding areas are reached later, since the wave covers shorter distances in the same period of time. Distances in these areas are thus weighted more heavily. The shortest paths generally try to avoid these areas and therefore the people or particles also avoid these areas since they move in the direction of the shortest path and thus follow this path. The direction of the shortest path in each point can be determined in each case by determining the gradient, that is to say the direction of the greatest change in potential See also the section on determining the direction of the shortest path and motion methods. If a person were to move in the direction of the greatest change in potential at a locally different speed $F(x, y)$, that is to say at precisely the wave propagation speed, he would reach the target more quickly than on all other paths. Generally however, the speed of the person does not correspond to the propagation speed of the wave $F(x, y)$, even though both can vary locally at the same time. The propagation speed of the wave $F(x, y)$ is merely an auxiliary quantity in this context and is inversely proportional to the weighting of the distances, that is to say the metric. It does not coincide with the actual speed of objects or people. For example, a person thus moves approximately just as fast over grass and paved surfaces. Generally however, the person would try to avoid the grass, and therefore distances over this would be weighted more heavily. This would imply a slower propagation speed F(x, y) of the wave propagation in order to determine the wave future time or the potential T(x, y). In FIG. 2b for example, the lower left area could correspond to grass. The actual speeds of the person would not be variable however, and would be constant in all areas.

F(x, y) thus does not coincide with the speed of the person, but merely with the preference for specific territories or other conditions.

FIG. 3 shows a hexagonal cell grid with an approximated Euclidean potential. The considered cellular state automaton consists of a regular grid with hexagonal cells, over which the considered particles or people move in discrete time steps. As described before, a potential is assigned to each cell. A cell may or may not be occupied either by a person or particle. The particles each move in discrete time steps to the next cell, wherein the direction of motion is determined by the potential of the adjacent cell. If more than one particle is considered, the path determination thus depends on those in the cells located adjacently.

FIG. 3 shows a schematic view of the proposed device in the example of a cellular state automaton with hexagonal cells when considering the Euclidean metric, that is to say when considering actual distances. In the cells, the shortest distance of the centre point determined by means of a fast-marching algorithm is provided. This potential forms the basis for the path search. In conventional potential-based motion methods, in each step the respective adjacent cell with the smallest potential starting from the current position is selected, and with a random path search this adjacent cell is provided with a greater probability. Even when using these conventional motion methods in combination with the methods implemented in this invention for calculating the underlying potentials for the purpose of target finding, much better results are obtained, more specifically illustrated as "path without correction" in FIG. 3, than with use of the Manhattan potentials used in conventional simulators of flows of people and objects. The latter lead primarily to a multiplicity of possible paths. However, if merely the local potential minimums are considered, deviations from an ideal path, illustrated in FIG. 3 as the "shortest path", are sometimes large even with use of the methods used here for calculating potential if the path "path without correction" in FIG. 3 is considered.

An advantageous implementation of a direction-based correction for a conventional motion method will be considered hereinafter, wherein the next cell for the motion is selected merely on the basis of the potential minimum, which corresponds to an approach of zero order. An approach of first order is selected for a direction-based correction. For example, there is a restriction to purely Euclidean potentials, that is to say (F(x, y)=1 outside obstacles. An extension for arbitrary potentials, that is to say arbitrary directions of distances or any F(x, y) outside obstacles is possible.

For each step, the direction of the shortest path is first determined, for example the direction of the gradient, that is to say the line "direction to the target" starting from point P0 in FIG. 3. Based on this, the deviation $n_A$ at right angles to the direction of the shortest path and the tangential deviation $t_A$ in the direction of the shortest path are calculated for each cell which can be entered from the current cell. The path from P0 to P1 is compared to the direct path "direction to the target" (line d). The tangential deviation $n_A$ is the path length $P1S_A$. The tangential deviation $t_A$ is the path length $S_A S_B$. The point $S_A$ is the intersection of the perpendiculars on line d by P1 with line d. The point $S_B$ is the point of intersection of the circular line with the centre point P0 and the radius P0P1 with the line d, that is to say the line of the direction to the target. The deviations $n_A$ are provided with a sign to determine the direction of the deviation.

Instead of reducing the motion merely to the adjacent cell with the smallest potential value, the two adjacent cells to the left and right of the smallest potential value are additionally considered. From these three candidates, the deviations $n_A$ at right angles to the direction of the greatest change in potential are determined. In addition, the sum of all deviations $n_A$ from the previous step $N_A$ is determined. In a memory-saving implementation, merely the sum is stored so that a storage of the individual deviations is omitted. The cell is now selected from the three potential candidates as the next cell on the path, and therefore the absolute value of the sum of all previous steps of the person plus the deviation for this step is minimal. If the cell to be selected is not the neighbor with the smallest potential, the potential of the cell to be selected is reduced, merely for this person or the particle in this step, until its potential values lies below the value of the smallest potential. For example, this may be achieved by subtracting the difference in the potentials plus a small number from the potential of the cell to be selected. The original method, which merely considers the potentials of the adjacent cell, which conventional simulation of flows of people use, can thus be retained. No further modifications of the conventional method are required, and for example other people can thus be considered by means of people repulsion potentials.

The path determined using the device according to the invention is the "path with correction" b in FIG. 3. Owing to the restrictions of the motion through the grid, the length of the path b is greater than the direct connection. At a predefined speed, a particle requires longer to reach the target than is to be expected with free motion. This is a typical problem of devices for the grid-based simulation of flows of objects and people.

However, according to the numerical solution of an eikonal equation, the values for the future times and the potential lie merely in the grid points of the underlying grid. That is to say in the cell centre points in our case. By means of interpolation however, the gradient can also be obtained using the device according to the invention. A schematic view can be found in FIG. 3. An area is spanned locally by linear interpolation of the points P0, P1 and P2, which area passes through the three points. With the aid of this area, the gradient/direction of the strongest change can be determined locally in each point of the triangle formed by P0, P1 and P2, as illustrated in FIG. 3. The solution proposed by way of example in this instance corresponds to an interpolation of first order of the potential for determining the gradient. Any other approaches for the approximate determination of the gradient are possible however. In principle, any number of values and grid points can be consulted in the approach developed in this instance in order to determine the local direction of the greatest changes by means of interpolation.

Figure 4:
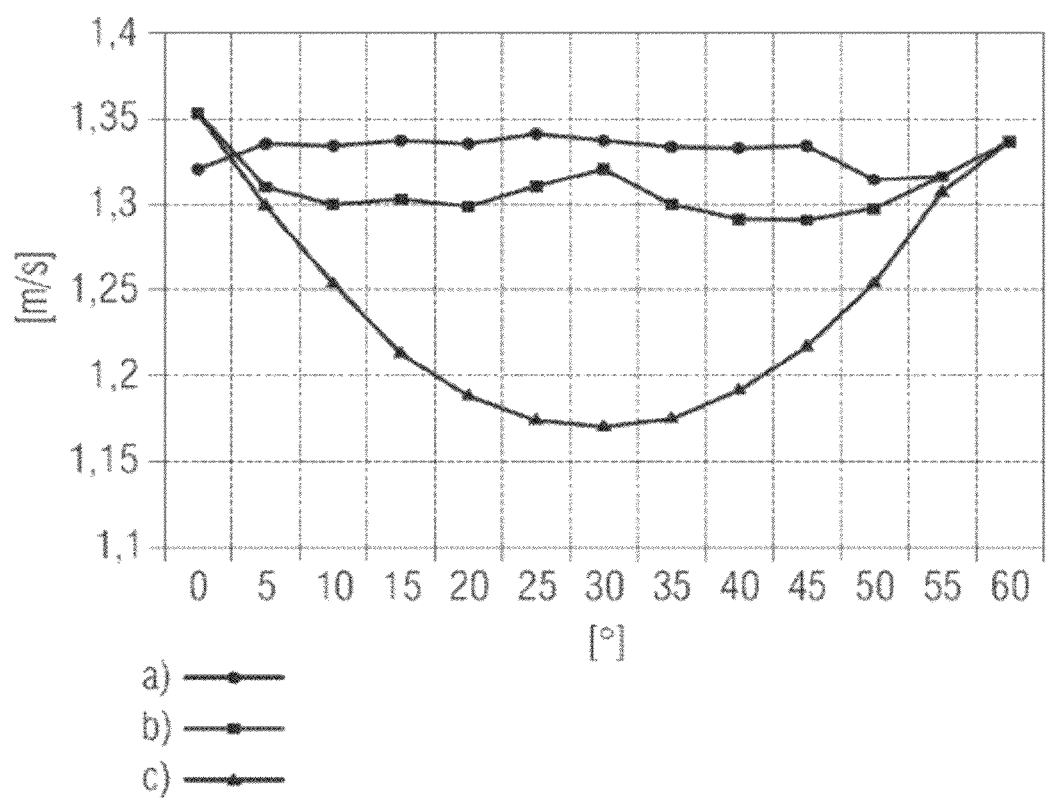
FIG. 4 is a view of the average speed as a function of the direction of travel and the motion correction.

FIG. 4 is a view of the average speed as a function of the direction of travel and motion correction, more specifically speed correction. The x-axis shows the direction of motion of the particles in degrees, and the y-axis shows the average speed of particles in meters per second. FIG. 4 shows the average speed for a path of 40 m with a speed of travel of 1.34 m/s per particle for different directions of travel (in degrees) and corrections. The angular dependence of the direction of travel or the grid dependence is shown very clearly with poor or no correction.

The tangential deviations $t_A$ from the ideal path calculated in each step can be used to correct speed. If the sum of all deviations $t_A$ of all previous steps of this person or this particle exceeds an integral multiple of the grid distance, the particle or person will thus be granted an additional step. The effective speed of the particle or person is increased locally in terms of time. This corrections allows effective speeds, as illustrated in FIG. 4. These effective speeds approximate the expected journey times for a given path, represented by the curve a in FIG. 4, much better than without correction, represented by the curve c in FIG. 4, or with use of known corrections, represented by the curve b in FIG. 4. For example, conventional corrections are the recognition of staggered steps.

In the presented advantageous memory-saving implementation of this method, merely the sum of all deviations $n_A$ as well as the sum of all deviations $t_A$ has to be stored. In each time step, the corresponding current deviations $n\Delta$ and $t\Delta$ are added together after selection of the move. Owing to the minimal number of variables to be calculated, the proposed device is also advantageous in terms of computational intensity.

The correction device considered by way of example takes into account the sum of all deviations $n_A$ and $t_A$ in the past of each particle. Alternative approaches are also possible. If the particle is pushed too far from its original path, for example by interaction with other particles, or if the particle finds itself in a situation in which the path cannot actually be freely selected, for example in a dense crowd, it is appropriate to reinitialize the sum of all deviations, that is to say to set to 0.

Figure 5:
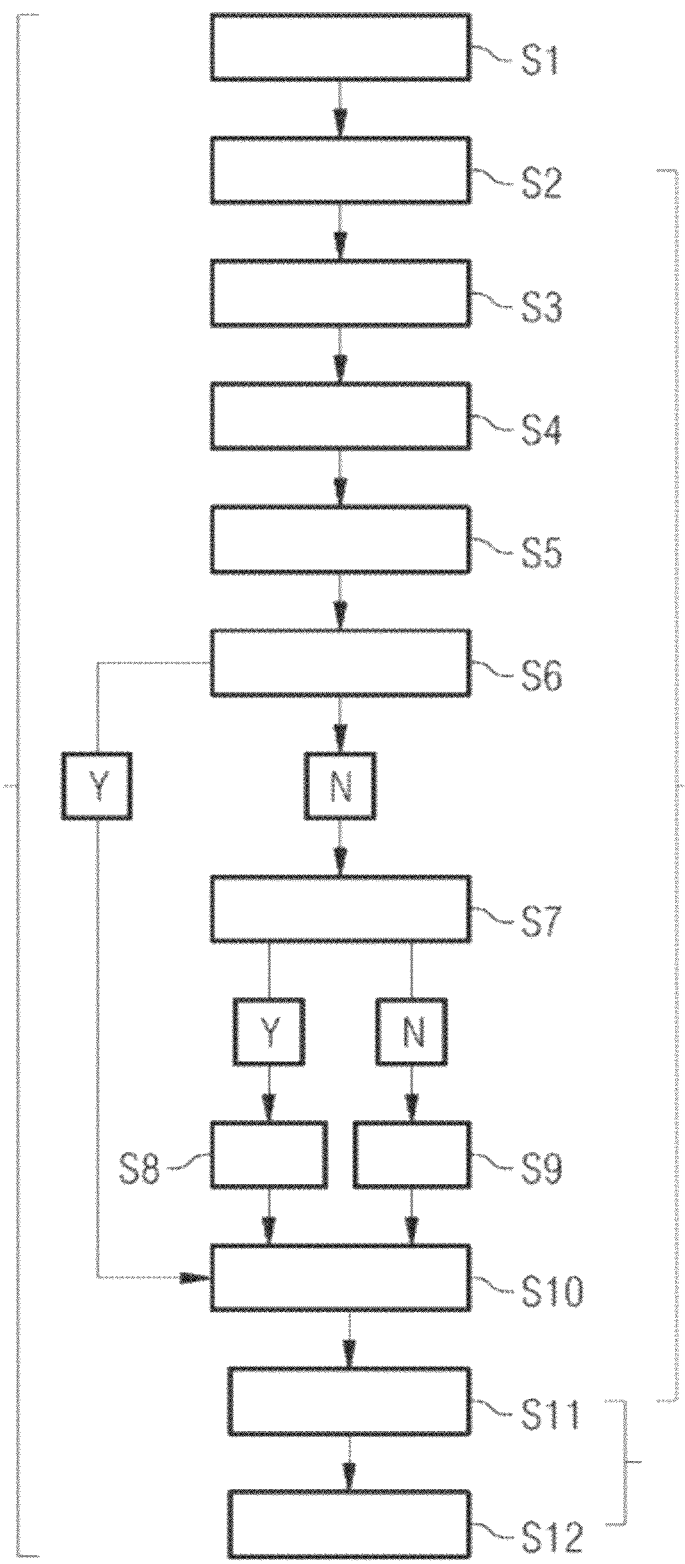
FIG. 5 is a schematic view of the generation of a motion of particles according to the invention by means of the simulation device according to the invention.

FIG. 5 shows a schematic view of the generation of a motion of particles by means of a device according to the invention.

According to FIG. 5, the following steps are carried out in a device according to the invention. In a step S1, one proceeds similarly to conventional algorithms. In a step S2, the direction R of the shortest path is determined. In a step S3, an adjacent cell $Z_M$ with the smallest potential value is established. In a step S4, the adjacent cells to the left $Z_L$ and to the right $Z_R$ of the cell $Z_M$ are determined. In a step S5, the distances $n_A(Z_L)$, $n_A(Z_M)$ and $n_A(Z_R)$ at right angles to the shortest path in the cells $Z_L$, $Z_R$, $Z_M$ are determined. In a step S6, two conditions are set:

$$N_A+n_A(Z_M)<N_A+n_A(Z_L) \text{ and } N_A+n_A(Z_M)<N_A+n_A(Z_R)$$

If neither condition is met, the following inequality is examined in a step S7:

$$N_A+n_A(Z_L)<N_A+n_A(Z_R)$$

If the inequality in step 7 is met, a step S8 is performed. In the step S8, the potential in $Z_L$ is corrected merely for this particle and for this step by the formula $P(Z_L)=P(Z_M)-0.00001$. If the inequality in step 7 is not met, a step S9 is performed. In the step S9, the potential in $Z_R$ is corrected merely for this particle and for this step by the formula $P(Z_R)=P(Z_M)-0.00001$. Step S10 follows the steps S8 and S9. The step S10 is also performed if, in step S6, the two equations are met. In the step S10, the particles move similarly to the conventional algorithms. In a step S11, the sum of the deviations at right angles to the shortest path $N_A=N_A+n_A(Z)$ and parallel to the shortest path $T_A=T_A+t_A(Z)$ is stored. In a step S12, an extra step is performed if $T_A$ exceeds an integral multiple of the cell distances. All steps S1 to S12 represent a modified course of motion for each step of each particle or each person. The steps S2 to s11 provide a direction correction. The steps S11 and S12 provide a speed correction.

Figure 6:
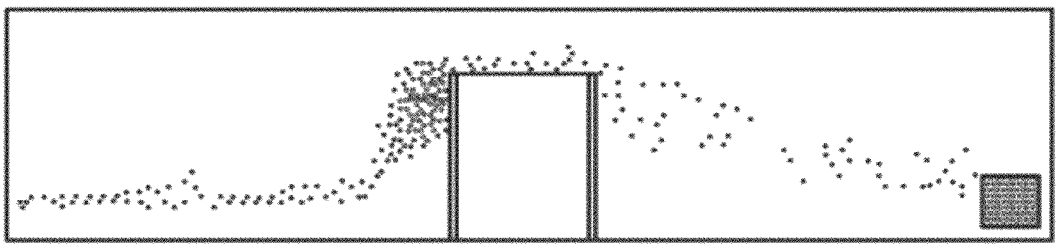
FIG. 6 shows a comparison of conventional path determination and path determination according to the present invention.
Figure 6:
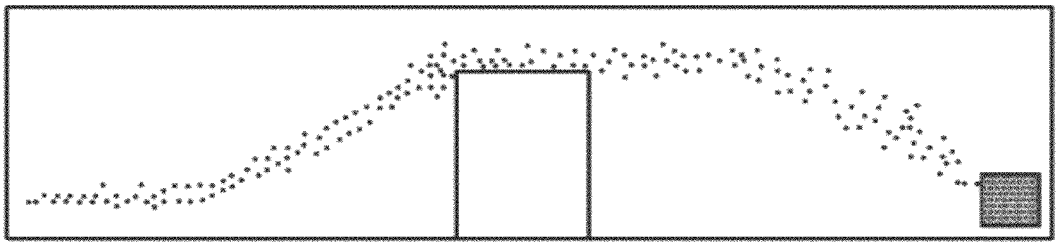
Figure 6:
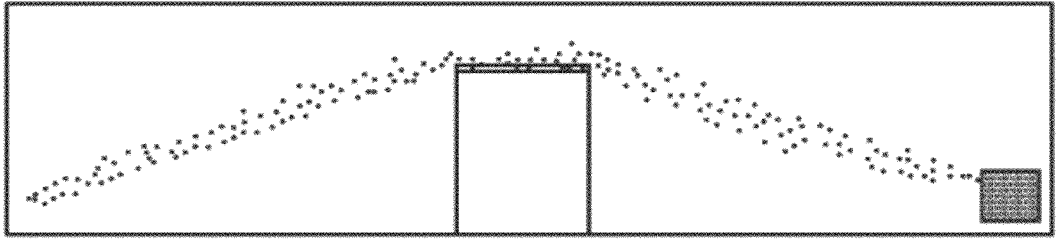

FIG. 6 shows a comparison of conventional path determination and path determination according to the present invention.

FIG. 6 shows a comparison of the different model-based methods for path determination for a cellular state automaton with hexagonal symmetry. FIG. 6a shows a Manhattan potential, that is to say the use of Dijkstra's algorithm with correction in the case of unobstructed view; FIG. 6b shows a Euclidean potential and the use of a fast-marching algorithm without correction; FIG. 6c shows the use of a Euclidean potential with use of a fast-marching algorithm with the correction according to the invention.

FIG. 6a shows the unclear and unrealistic behavior of flows of objects and people on the basis of Dijkstra's approach, which provides an unrealistically large number of possibilities of the motions.

Generally, the device according to the invention can also be implemented without corrections in terms of the motion directions and speeds. If, in existing devices for simulating flows of objects and people, merely the methods for calculating the target potential are exchanged, much better motion patterns are provided than with use of a conventional Dijkstra's algorithm. For example, there are much fewer bottlenecks at corners, as is illustrated for example in FIG. 6b. Merely a minimal modification of the existing simulation device is necessary. Generally, only the function for potential calculation has to be replaced.

Furthermore, the device according to the invention allows real travel times of people to be approximated as precisely as possible. This correction is detached from potential. For example, it can also be used in the event of an unobstructed view, since in this case the Euclidean distance can be determined directly.

A substantially more realistic space-time dynamic is provided, as illustrated in FIGS. 6b and 6c, since the motions are based on an approximation of the actual distance weighting. Conventional simulators of flows of people and objects determine distances along the discretization directions predefined intrinsically by the method, for example along the directions of symmetry of the cells in cellular state automata. The quality of the motions in the method presented here is based on the shortest paths with respect to arbitrary distance weightings, that is to say in particular the Euclidean distance weighting, and is merely limited by the discretization accuracy of the fast-marching method. The considerably realistic behavior of the people or particles simulating these people leads to a significant increase in the validity of the simulators of flows of objects and people according to the invention, simultaneously with only a minimally greater computational effort.

FIG. 6 illustrates the comparison of different methods of path searching in cellular state automata. The topology shows the people source on the left and the respective target on the right. The direct path is blocked by an obstacle.

When using a flood-based path search by means of Dijkstra's algorithm, the people move too steeply towards the wall. They move around the corner practically along the wall. This results in a bottleneck, as illustrated in FIG. 6a. Not until after the obstacle is a correction or control based on view possible, alternatively the people would be caught before the wall. The same method with a Euclidean metric based on the calculation by means of the eikonal equation, that is to say wave propagation, leads to flatter angles and thus to no bottlenecks, as illustrated in FIG. 6b. If, in addition, the proposed correction is now taken into account, the simulation of a flow of people demonstrates realistic behavior: the people follow the shortest paths both in front of and also after the obstacle, as illustrated in FIG. 6c. The advantage of the simulator of flows of people proposed in accordance with the invention is clearly visible.

Figure 7:
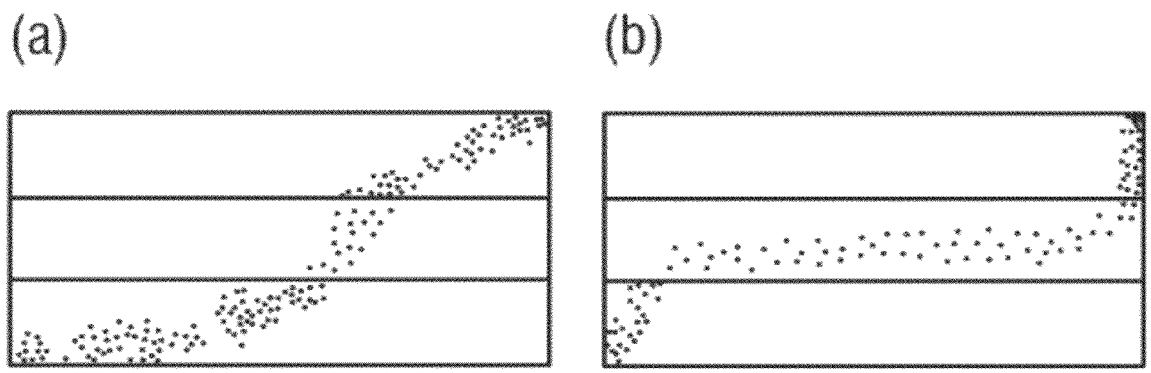
FIG. 7 shows two exemplary embodiments of motions with different distance weightings.

FIG. 7 shows two embodiments of motions with different distance weightings. FIG. 7 shows intelligent people flows over areas with different preference, that is to say weighting. In FIG. 7a, dark areas are avoided, and in FIG. 7b light areas are avoided.

The device according to the invention enables a realistic path search. Many problems of conventional methods, which in many cases demonstrate an unrealistic behavior of the flows of people and objects, are avoided. In particular, the proposed device allows the implementation of a certain intelligence of the pedestrians. It is thus possible to implement preference for a specific territory, for example the avoidance of roads or a dense crowd. Such territories are basically only entered if they cannot be avoided, for example if a target is on the other side of the road, the path over this territory being kept as short as possible. This is illustrated in FIG. 7a. This realistic behavior is important in particular if the free areas to be considered are large and the expected densities of people are low, that is to say for example when optimizing the design of shopping centers or when considering complex spaces, partly covered by buildings.

FIG. 7 illustrates a further example formed on the basis of a potential based on distances with different weighting. In each case the person source is located in the bottom left corner. The target of the person is in the top right corner. Depending on the weighting of the distances, areas are avoided or preferred. In FIG. 7a a movement over the upper and lower areas is preferred, whereas in FIG. 7b movement in the middle area is preferred. In the first case, F(x, y) is greater over the upper and lower areas; in the second case it is greater over the middle area. In both cases the pedestrians demonstrate intelligent behavior and move predominantly over the preferred areas and try to keep paths over the other areas as short as possible.

The above examples illustrate that it is possible to easily determine which elements of the present invention will be used on the basis of the behavior of the particles or simulated people. This is possible as soon as there is access to the people data, for example in the form of a visualization or computer animation or in the form of calculation tables. Such information is generally provided, since it represents the basic result of a simulation of a flow of people. Evaluations of the simulation for the planning of an evacuation or for the design of escape plans are based on this data.

The model of the device I according to the invention can be transferred to a computer device using a corresponding model. This to say, the device can also be copied by a computer. Such an embodiment is also including in the scope of protection of this application.

Figure 8:
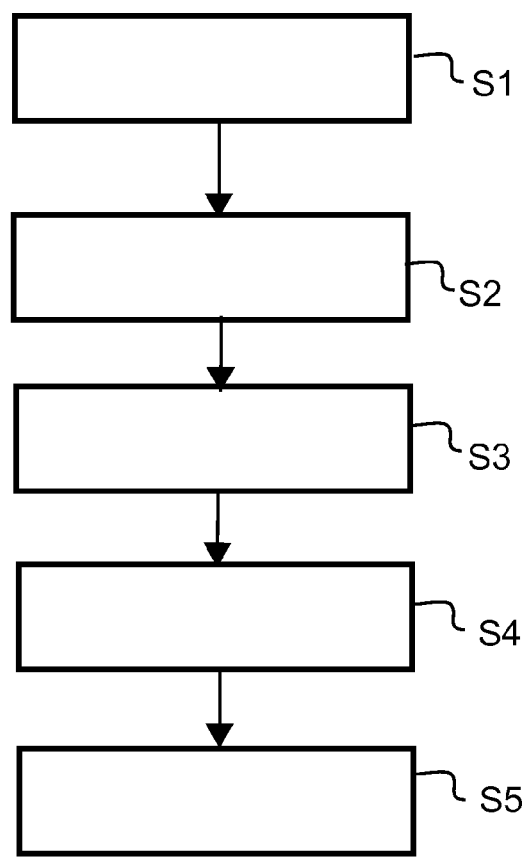
FIG. 8 shows an exemplary embodiment of a method according to the invention.

FIG. 8 shows an exemplary embodiment of a method according to the invention.

In a step S1, a simulation device (I) with a spatial region superimposed by a cell grid (5) is provided, wherein each cell takes on various occupation and total potential states which are adjusted by means of a control device (7) and a computer device (9), wherein each cell is assigned a target potential determining how particles (3) are attracted to a target (Z), and an obstacle potential is assigned determining how particles (3) are repelled by an obstacle (H), and wherein each particle (3) is assigned a particle potential, wherein a total potential in a cell is made up of the values of the target potential and the obstacle potential in the cell and the particle potentials of particles (3), detected by means of a second detection device, in cells adjacent to the cell. In a step S2, positions of people at a starting time over a spatial region to be monitored are detected by means of a first detection device (0) and metal balls (3) are positioned accordingly at respective starting cells (S), wherein the metal balls (3) then each change from a cell into an adjacent cell having a least total potential;

In a step S3, the positions of the metal balls (3) are detected by means of the second detection device (1). In a step S4, the total potential states are updated by means of the second detection device (1), the computer device (9) and the control device (7), wherein, starting from the target (Z) to each cell, the target potential for each cell is calculated by means of a computer device (9) using a length of a shortest distance from the target (Z) to a respective cell centre point. In a step S5, the motions of the actual people (3) are controlled in case of forecast critical situations which were detected in advance by means of the computer device (9) or the simulation device (I). For example, a critical situation may be a bottleneck of people, which for example is relieved by opening an additional passage (15) by means of a central controller (13).

The invention claimed is:

1. A system for controlling motions of a multiplicity of particles in a spatial region having at least one target and at least one obstacle, the system comprising:
   a first detection device for detecting positions of the particles at a starting time;
   a computer device configured to predict a future path of the particles, wherein a cell grid is superimposed on the region and each cell takes on various occupation and total potential states, and each cell is assigned a target potential determining how particles are attracted to the at least one target, and an obstacle potential is assigned determining how particles are repelled by an obstacle, and wherein each particle is assigned a particle potential, wherein a total potential in a cell is made up of the values of the target potential and the obstacle potential in the cell and the particle potentials of particles in cells adjacent to the cell, and particles each change from a cell into an adjacent cell having a least total potential, and additionally, starting from a target to each cell, the target potential for each cell has been calculated using a length of a shortest future path of a particle to the target of a respective cell center point;
   wherein said computer device locally calculates a direction of a greatest change in magnitude of the target potential as the direction of the shortest path to the target, and based on the information thus obtained approximates a realistic motion along the shortest path over the cell grid by way of a direction correction;
   a central controller for controlling the motions of the particles in case of a forecast critical situation; and
   the system being configured for:
   considering an adjacent cell with a smallest target potential value and additionally two adjacent cells to the left and right of the adjacent cell with the smallest target potential value for direction correction starting from a current cell;
   establishing for each of the three adjacent cells a normal deviation nΔ at right angles to the direction of the shortest path, starting from the local direction of the shortest path of a cell center point of the current cell, a normal deviation nΔ having a direction-dependent sign in each case;
   establishing a sum NΔ of all normal deviations nΔ from the previous steps of an respective particle; and
   selecting the adjacent cell acting as the next cell for the particle in such a way that the absolute value of the sum NΔ of all previous steps of the particle, including the normal deviation nΔ for this step, is minimal, with the direction correction occurring as a result of the selection.

2. The system according to claim 1, wherein said computer device is configured for calculating the target potential by describing the target as a curve of any shape, starting from the curve considering a propagation of a wave front, described by way of the curve, wherein vectors of a speed of the propagation F(x,y) are selected at right angles to the wave front in each instance, and by calculating a future time T(x,y) of the wave front for each point (x,y) in the space, wherein the target potential in the respective point (x,y) is calculated as directly proportional to the future time T(x,y) of the wave front in the respective point (x,y).

3. The system according to claim 2, wherein the propagation of the wave front is described mathematically by an eikonal equation:

$$F(x,y)^2[(\delta_x T(x,y))^2 + (\delta_y T(x,y))^2] = 1.$$

4. The system according to claim 1, wherein said computer system is configured for selecting a plurality of spatially varying propagation speeds F(x,y)>0 for each point (x,y) of the wave front instead of a speed of the propagation F(x,y) of the wave front, wherein a distance weighting occurs as a result, which is location-dependent, and wherein the propagation speed F(x, y) is selected inversely proportional to the distance weighting.

5. The system according to claim 1, which comprises a control device which, if the selected adjacent cell is not the adjacent cell with the smallest target potential value, decreases the target potential of the selected adjacent cell until a value of the target potential is less than the smallest target potential value.

6. The system according to claim 1, wherein a speed correction for a momentary particle speed takes place by means of known previous deviations from a shortest path.

7. The system according to claim 1, wherein said control device is configured to set a sum NΔ of the normal deviations or the sum TΔ of the tangential deviations to zero if the particle is pushed too far from its original path or if the particle cannot freely select its path.

8. The system according to claim 1, wherein said control device is further configured, starting from the target potentials of three cell center points, to determine locally the direction of the greatest change in the target potential by interpolating each point of a triangle formed by three cell center points.

9. The system according to claim 1, wherein said computer device is configured to:
determine locally a direction of a greatest change in the target potential, which is a direction of the shortest path to the target; and
determine a current shortest path for a particle by way of a weighted averaging of greatest changes to the target potential of the shortest path of the particle in previous cells.

10. The system according to claim 1, wherein a path selection of the particles is random-based and said computer device is configured to calculate probabilities of individual cells on the basis of the total potential and the information regarding the direction of the shortest path.

11. The system according to claim 1, wherein said central controller is configured for controlling elements of a building.

12. The system according to claim 1, wherein the elements of the building are selected from the group consisting of doors, windows, signs, loudspeakers, lifts, escalators, and lights.

13. The system according to claim 1, wherein the particles represent persons.

14. A system for controlling motions of a multiplicity of particles in a spatial region having at least one target and at least one obstacle, the system comprising:
a first detection device for detecting positions of the particles at a starting time;
a computer device configured to predict a future path of the particles, wherein a cell grid is superimposed on the region and each cell takes on various occupation and total potential states, and each cell is assigned a target potential determining how particles are attracted to the at least one target, and an obstacle potential is assigned determining how particles are repelled by an obstacle, and wherein each particle is assigned a particle potential, wherein a total potential in a cell is made up of the values of the target potential and the obstacle potential in the cell and the particle potentials of particles in cells adjacent to the cell, and particles each change from a cell into an adjacent cell having a least total potential, and additionally, starting from a target to each cell, the target potential for each cell has been calculated using a length of a shortest future path of a particle to the target of a respective cell center point;
a central controller for controlling the motions of the particles in case of a forecast critical situation;
wherein a speed correction for a momentary particle speed takes place by means of known previous deviations from a shortest path; and
a direction of a greatest change in the target potential locally determines a direction of the shortest path to the target; and wherein
for speed correction starting from the local direction of the shortest path of a cell center point of a current cell, a tangential deviation tΔ in the direction of the shortest path is established for any step for each cell that is entered next from the current cell;
a sum TΔ of all tangential deviations tΔ of all previous steps of a current particle is established; and
an additional step for the particle is granted by said control device if the sum TΔ of all tangential deviations tΔ of all previous steps for the particle is greater than an integral multiple of a cell center point distance, wherein an effective speed of the particle is thus increased locally in terms of time and is therefore corrected.

15. A method of controlling motions of a multiplicity of particles in a spatial region having at least one target and at least one obstacle, the method which comprises:
detecting positions of the particles at a starting time;
predicting, using a computer device, a future path of the particles, wherein the region has been superimposed by a cell grid and each cell takes on various occupation states and total potential states, and each cell is assigned a target potential determining how particles are attracted to a target, and an obstacle potential is assigned determining how particles are repelled by an obstacle, and wherein each particle is assigned a particle potential, wherein a total potential in a cell is made up of the values of the target potential and the obstacle potential in the cell and the particle potentials of particles in cells adjacent to the cell, and particles each change from a cell into an adjacent cell having a least total potential, and additionally, starting from a target to each cell, the target potential for each cell has been calculated using a length of a shortest distance from the target to a respective cell center point; and calculating a direction of a greatest change in magnitude of the target potential as the direction of the shortest path to the target, and based on the information thus obtained approximating a realistic motion along the shortest path over the cell grid by way of a direction correction;

controlling the motions of the particles in case of forecast critical situations; and considering an adjacent cell with a smallest target potential value and additionally two adjacent cells to the left and right of the adjacent cell with the smallest target potential value for direction correction starting from a current cell;

establishing for each of the three adjacent cells a normal deviation $n\Delta$ at right angle to the direction of the shortest path, starting from the local direction of the shortest path of a cell center point of the current cell, a normal deviation $\Delta$ having a direction-dependent sign in each case;

establishing a sum $N\Delta$ of all normal deviations $n\Delta$ from the previous steps of an respective particle; and selecting the adjacent cell acting as the next cell for the particle in such a way that the absolute value of the sum $N\Delta$ of all previous steps of the particle, including the normal deviation $n\Delta$ for this step, is minimal, with the direction correction occurring as a result of the selection.

* * * * *